(12) United States Patent　　　　　(10) Patent No.:　US 12,635,686 B2

Bernard　　　　　　　　　　　　　　(45) **Date of Patent:　*May 26, 2026**

(54) COMPOSITIONS AND METHODS FOR IMPOSING SEED QUALITY

(71) Applicant: Drexel Chemical Company, Memphis, TN (US)

(72) Inventor: Milton Stanley Bernard, Roseville, TN (US)

(73) Assignee: Drexel Chemical Company, Memphis, TN (US)

( * ) Notice: Subject to any disclaimer, the term of this patent is extended or adjusted under 35 U.S.C. 154(b) by 388 days.

This patent is subject to a terminal disclaimer.

(21) Appl. No.: 16/844,179

(22) Filed: Apr. 9, 2020

(65) Prior Publication Data

US 2020/0281192 A1　　Sep. 10, 2020

Related U.S. Application Data

(63) Continuation of application No. 15/118,232, filed as application No. PCT/US2015/018061 on Feb. 27, 2015, now Pat. No. 10,653,130.

(60) Provisional application No. 62/096,228, filed on Dec. 23, 2014, provisional application No. 61/946,680, filed on Feb. 28, 2014.

(51) Int. Cl.
　　*A01N 25/00*　　　　(2006.01)
(52) U.S. Cl.
　　CPC .................................... *A01N 25/00* (2013.01)
(58) Field of Classification Search
　　CPC ...................................................... A01N 25/00
　　See application file for complete search history.

(56) References Cited

U.S. PATENT DOCUMENTS

| | | | | |
|---|---|---|---|---|
| 3,803,294 | A ‡ | 4/1974 | Okada et al. ............. | C01C 3/20 |
| | | | | 423/365 |
| 3,855,219 | A | 12/1974 | Fuchs et al. | |
| 3,975,181 | A * | 8/1976 | Watanabe .............. | A01N 37/02 |
| | | | | 504/147 |
| 4,552,582 | A | 11/1985 | Kruger | |
| 6,545,043 | B1 | 4/2003 | Coats et al. | |
| 2003/0224936 | A1 | 12/2003 | Kretzschmar | |
| 2004/0241635 | A1 ‡ | 12/2004 | Buckley ................... | A01C 1/00 |
| | | | | 435/4 |
| 2009/0203525 | A1 ‡ | 8/2009 | Guariglia .............. | A01N 29/02 |
| | | | | 504/141 |
| 2013/0096004 | A1 * | 4/2013 | Mihura ................ | A01H 6/4684 |
| | | | | 504/163 |
| 2017/0172141 | A1 * | 6/2017 | Bernard ................. | A01N 25/00 |

FOREIGN PATENT DOCUMENTS

| | | | |
|---|---|---|---|
| CA | 1118226 A | ‡ | 2/1982 |
| CA | 2835406 A1 | ‡ | 11/2012 |
| DE | 240 830 A1 | | 11/1986 |
| DE | 280 687 A1 | | 7/1990 |
| EP | 0038948 A2 | ‡ | 11/1981 |
| EP | 787429 A2 | ‡ | 8/1997 |
| GB | 1229585 A | ‡ | 4/1971 |
| GB | 1349849 A | ‡ | 4/1974 |
| WO | WO 2013/055916 | | 4/2013 |

OTHER PUBLICATIONS

The Brittanica Dictionary, "thereof," <https://www.britannica.com/dictionary/thereof>, p. 1, Copyright 2024 Encyclopedia Brtannica, Inc.*

DeFrance et al., "Killing weed seeds in the grass seedbed by the use of fertilizers and chemicals," Journal of the American Society of Agronomy, vol. 39, pp. 530-535, 1947.‡

Mashev et al., "Influence of some growth regulators on the seed-forming process and on the phytohormone composition of cabbage," Competes Rendus de L'Academi Bulgare Des Sciences, vol. 40, No. 10, pp. 99102,1987.‡

Drexel, "Defol® 750 Defoliant/Desiccant with Fire Retardant", published Jun. 16, 2009,p. 1-5.‡

Thompson et al., "The Germination of lettuce seed stimulated by chemical treatment," Science, vol. 87, pp. 218-219, Jan. 1, 1938.

Defrance et al., "Inhibiting Weeds in Seedbeds with Chemicals," Agricultural Experimental Station, pp. 355-360, 1950.

Cooper et al., "Pre-harvest chemical top killing of legume seed crops," Scientific Agriculture, pp. 281-284, 1951.

Defrance et al., "Killing weeds in the grass seedbed by the use of fertilizers and chemicals," Journal of the American Society of Agronomy, vol. 39, pp. 530-535, 1947.

Jehle et al., "Early home-grownseed for planting the late patatocrop," American Patato Journal, vol. 29, pp. 1-7, 1952.

Corns, et al., "Pre-Harvest Chemica Top-Killing OG Legume Seed Crops," Candaian Journal of Agricultural Science, vol. 32, pp. 269-273, 2010.

Mueller et al., "Some Effects of Thiocyanates on Growth and Disease Resistance of Cereal Plants," Archiv Fur Phytopathologie Und Pflanzenschutz, vol. 24, No. 3, pp. 261-263, 1988.

Towsend, "The ammonium thiocyanate treatment for hastening the sprouting of dormant bliss triumph potatoes," American Potato Journal, vol. 23, pp. 92-94, 1946.

International Search Report and Written Opinion in International Application No. PCT/US2015/018061, dated May 7, 2015.

* cited by examiner* cited by examiner
‡ imported from a related application

*Primary Examiner* — Monica A Shin

(74) *Attorney, Agent, or Firm* — Finnegan, Henderson, Farabow, Garrett & Dunner, LLP

(57)　　　　　　ABSTRACT

Compositions and methods are disclosed for improving seed quality. For example, treating a stand of seed crops with a seed crop treatment that includes an effective amount of cyanate, thiocyanate, an acceptable salt of cyanate or thiocyanate, an ester of cyanate or thiocyanate, an isocyanate or isothiocyanate, or a combination thereof results in one or more improved seed qualities compared to a control. The improved seed qualities may include, but are not limited to, enhanced seed vigor, increased quantity of saleable seed, increased proportion of saleable seed, increased uniformity of seed shape and size, and desirable bag weight.

40 Claims, No Drawings

COMPOSITIONS AND METHODS FOR IMPOSING SEED QUALITY

This application is a continuation application of application Ser. No. 15/118,232, filed Aug. 11, 2016, which is a $371 of international application PCT/US2015/018061, filed Feb. 27, 2015, and claims the benefit of U.S. Provisional Patent Application No. 61/946,680 filed Feb. 28, 2014, and U.S. Provisional Patent Application No. 62/096, 228 filed Dec. 23, 2014; the contents of each of the applications is incorporated by reference in its entirety.

Seed quality is critical to both seed companies and farmers alike as it can affect, for example, the quantity and/or proportion of saleable seed, the uniformity of seed at desirable sizes and shapes, seed shelf-life, seed germination and crop yields.

It is therefore a goal of seed production to produce seeds with high viability over a wide range of field conditions. The ability of a seed to germinate under a wide range of field conditions, particularly stress conditions, is characterized as "seed vigor." Improving seed vigor carries many advantages for farmers and the seed industry. For example, enhanced seed vigor can increase crop yields, result in more uniform emergence, and improve resistance to environmental stresses. Thus, better performing seed, especially under adverse conditions, offers clear benefits to farmers. Additionally, seed companies benefit from high vigor seeds through the reduction of replant refunds when seed fails to perform because of, for example, environmental stress.

Enhanced seed vigor would also improve seed shelf-life, allowing seed to maintain high viability when carried over from one growing season to the next, without being "reworked." "Reworking" of seed that has dropped below acceptable germination levels involves blending the low germination seed with higher germination seed to achieve a blend having acceptable minimum germination levels. Such "reworked seed," however, suffers from reduced viability, and is thus subject to limitations such as the need to be planted quickly and under favorable germination conditions. Further, seeds are commonly treated with insecticides and/or fungicides to protect them from pests before and after planting. If seed that has been treated with insecticide and/or fungicide cannot be "reworked," it may require disposal by various and potentially costly processes.

Additionally, because farmers often do not have equivalent seed handling and storage facilities as seed companies, seed saved and stored by farmers may be subjected to more stressful conditions thereby reducing viability. Historically, farmers compensated for this drop in viability by increasing their seeding rate. Increased seeding rates, however, can lead to inefficient planting, such as overcrowding. Enhanced seed vigor reduces the need to increase seeding rates and would allow farmers to maintain seeds with high viability, even under stressful conditions.

Yield of desirable sizes and shapes of seed is a further seed quality directly affecting the quantity and proportion of saleable seed. For example, an increased proportion of saleable seed means that seeds were more uniformly produced at commercially acceptable sizes and shapes (i.e., a greater percentage of harvested seed exhibits commercially acceptable sizes and shapes). Uniformity in desirable sizes and shapes aid in mechanical planter efficiency. In addition, variations in harvested seed may require recalibration of equipment or other operational adjustments during seed production.

Accordingly, the present disclosure provides, among other things, compositions (e.g., treatments) and methods that result in one or more of the following: enhanced seed vigor, increased quantity and/or proportion of saleable seed, increased uniformity of seed shape and size, and desirable bag weight.

The present disclosure is directed to compositions (e.g., seed crop treatments) comprising cyanate, thiocyanate, an acceptable salt of cyanate or thiocyanate, an ester of cyanate or thiocyanate, an isocyanate or isothiocyanate, or a combination thereof, and one or more agrichemicals.

The present disclosure is further directed to a method of preparing a seed crop treatment comprising combining cyanate, thiocyanate, an acceptable salt of cyanate or thiocyanate, an ester of cyanate or thiocyanate, an isocyanate or isothiocyanate, or a combination thereof with one or more agrichemicals.

The present disclosure is also directed to a method of producing seeds comprising treating a stand of seed crops with a seed crop treatment that comprises cyanate, thiocyanate, an acceptable salt of cyanate or thiocyanate, an ester of cyanate or thiocyanate, an isocyanate or isothiocyanate, or a combination thereof.

DESCRIPTION

Disclosed herein are compositions and methods for improving seed quality based on the present inventor's discovery that a seed assemblage obtained from a stand of seed crops treated with a chemical composition, such as a seed crop treatment, that comprises cyanate, thiocyanate, an acceptable salt of cyanate or thiocyanate, an ester of cyanate or thiocyanate, an isocyanate or isothiocyanate, or a combination thereof unexpectedly improves one or more seed qualities compared to a control. Improved seed qualities may include, but are not limited to, enhanced seed vigor, increased quantity and/or proportion of saleable seed, increased uniformity of seed shape and size, and desirable bag weight.

Seed quality can be evaluated by germination tests, such as warm germination, cold germination, and saturated cold germination. These types of tests are commonly used to predict seed germination and emergence. Among these tests, the saturated cold germination test exposes the seeds to cold, wet, and oxygen deficient stress, and is thus considered probative of seed germination viability over a range of field conditions.

The term "stand of seed crops" refers to a living assemblage of seed crops. A stand can be measured by determining the total dry mass of seed crops in an area.

The term "seed crops" refers to any type of plant from which seed may be harvested. The term "seed crops" includes monocotyledons (monocots) and dicotyledons (dicots). Examples of monocots include, but are not limited to, maize (corn and includes all varieties), sorghum, wheat, rice, barley, and oats. Examples of dicots include, but are not limited to, soybean, alfalfa, tomato, sunflower, cotton, and flowers, such as geranium, impatiens, and pansy.

The term "seed assemblage" refers to a collection of seeds harvested from a stand of seed crops.

The term "effective amount" means an amount sufficient to improve one or more qualities of a seed assemblage compared to a control. Improved qualities may include, but are not limited to, enhanced seed vigor, increased quantity and/or proportion of saleable seed, increased uniformity of seed shape and size, and desirable bag weight. Other improved qualities may include those to enhance production or marketability of the seed assemblage not already mentioned. The quality may further be something measured or qualitatively evaluated in a seed assemblage, such as chemical and/or physical characteristics.

Desirable bag weight refers to seed bag weights that are desirable for a particular seed crop. For example, desirable bag weight may be less than 60 lbs., such as from about 48 lbs. to about 54 lbs., for certain seed crops, such as corn. Desirable bag weights for other seed crops can take into consideration factors, such as optimizing seed planting machinery and/or state of seed crop (i.e., live or heavy coated).

As used herein, "a control" refers to a seed assemblage obtained from a stand of seed crops not subjected to a composition disclosed herein, wherein the stand of seed crops is a similar type and is harvested at a similar maturity stage as the stand of seed crops treated with a composition disclosed herein to which the comparison is made. In some instances, the control also refers to a seed assemblage obtained from a similarly sized stand of seed crops as the stand treated with a composition disclosed herein. In some instances, the control further refers to a seed assemblage obtained from a stand of seed crops grown under conditions similar to those for the stand treated with a composition disclosed herein. For example, in some instances, the stand of seed crops that produces the control seed assemblage and the stand of seed crops treated with a composition disclosed herein may be subjected to similar, ideal or non-ideal growing conditions for comparing one or more seed qualities, e.g., seed vigor levels. Moreover, the control in some instances refers to prior knowledge or historical characteristics (e.g., seed vigor, saleable seed, uniformity, etc.) of a seed assemblage from a stand of seed crops.

The term "saleable seed" refers to seed that is viable and is of commercially acceptable size and shape. For example, an increased proportion of saleable seed means that seeds were more uniformly produced at commercially acceptable sizes and shapes (i.e., a greater percentage of harvested seeds exhibit commercially acceptable sizes and shapes). In some embodiments of the present disclosure, a seed assemblage obtained from a stand of seed crops treated with a seed crop treatment described herein exhibits at least a 2, 3, 4, 5, 6, 7, 8, 9, 10, 11, 12, 13, 14, or 15 percent increase, such as at least a 2 percent increase or at least a 5 percent increase, in the quantity and/or proportion of saleable seed compared to a control.

The term "seed vigor" refers to a measure of the quality of a seed assemblage based on certain properties, such as percent germination, which can predict seed germination and emergence under a wide range of field conditions, particularly stress conditions. The methodology of the present disclosure can be followed to produce a seed assemblage that is characterized by enhanced seed vigor, as determined by seed vigor testing. The level of seed vigor possessed by a collection of seeds can be determined by a variety of techniques. One such technique is known as the saturated cold germination test. According to the Seed Vigor Testing Handbook by the Association of Official Seed Analysts (2009), the saturated cold germination test is the most stressful of various cold-test procedures for determining the vigor of a seed assemblage. In this test, the soil or planting medium is maintained at 100% water holding capacity for the duration of the test, which also subjects seeds to suboptimal temperatures and soil-borne pathogens. These conditions evaluate seeds based on their response to three stress factors: imbibitional chilling injury, attack by soil-borne pathogens, and limited oxygen availability. These harsh conditions can allow testers to discriminate between seed assemblages differing in vigor, and thus the saturated cold germination test can act as a good indicator of seed quality for many crops.

Thus, in some embodiments of the present disclosure, a seed assemblage exhibits enhanced seed vigor if it has a higher germination percentage in the saturated cold germination test when compared to a control. In some embodiments, a seed assemblage obtained from a stand of seed crops treated with a seed crop treatment described herein exhibits at least a 2, 3, 4, 5, 6, 7, 8, 9, 10, 11, 12, 13, 14, or 15 percent increase, such as at least a 2 percent increase, at least a 5 percent increase, at least a 10 percent increase, or at least a 15 percent increase in percent germination over a control in the saturated cold germination test.

While the saturated cold germination test is one technique that may be used to measure the level of seed vigor of a seed assemblage, the present disclosure is not so limited and contemplates the use of other seed vigor tests. Similarly, while germination is a measurable seed property for purposes of determining the level of seed vigor of a seed assemblage, the present disclosure also contemplates the measurement of other seed properties for purposes of determining vigor.

The term "agrichemicals" (or "agrochemicals") refers to chemicals for use in agriculture. Examples of agrichemicals include, but are not limited to, pesticides (including bactericides, herbicides, insecticides, fungicides, and biocides), fertilizers, desiccants, defoliants (some, but not all, defoliants are desiccants), plant growth regulators, adjuvants (such as, surfactants and crop oil concentrates), and combinations thereof. The agrichemicals may be in various forms such as solid (e.g., crystalline, pellets, granules, dust), semi-solid, liquid, and/or vapor.

The term "dissolved" or "dissolving" is not limited to any particular degree of dissolution. For example, when "dissolving" an amount of salt in one or more solvents, the amount may be incompletely or completely dissolved, including forming unsaturated, saturated, or supersaturated solutions.

The term "physiological maturity" refers to the seed development stage at which time translocation of nutrients to the seed stops.

The term "solvent" encompasses liquids, solids, semi-solids, and gases. For example, cyanate, thiocyanate, an acceptable salt of cyanate or thiocyanate, an isocyanate or isothiocyanate, or a combination thereof may be combined with one or more solvents by, e.g., mixing, dissolving, suspending, incorporating, milling, granulating, or any other way of bringing the components together.

As used herein, the singular forms "a," "an," and "the" include plural reference unless the context dictates otherwise.

Seed Crop Treatments

In one embodiment of the present disclosure, a seed crop treatment comprises cyanate, thiocyanate, an acceptable salt of cyanate or thiocyanate, an ester of cyanate or thiocyanate, an isocyanate or isothiocyanate, or a combination thereof, and one or more agrichemicals. A "combination thereof" may be a combination of elements from two different classes (e.g., a combination of an acceptable salt of cyanate and a cyanate ester) and/or a "combination thereof" may be a combination of elements within the same class (e.g., a combination of an acceptable salt of cyanate and an acceptable salt of thiocyanate). The one or more agrichemicals may be in a form, including, but not limited to, a solid, semi-solid, liquid, gas, or combinations thereof. Thus, the seed crop treatment is not necessarily limited to any particular type of preparation. For example, components that comprise the treatment may be combined, e.g., by mixing, dissolving, suspending, incorporating, milling, granulating, or any other way of combining the components.

Cyanate is an anion with the chemical formula written as $[OCN]^-$ or $[NCO]^-$. Similarly, thiocyanate is an anion with the chemical formula written as $[SCN]^-$ or $[NCS]^-$. Cyanate or thiocyanate may be produced or obtained via several different pathways. Commonly, they are manufactured in their salt forms, such as alkali cyanates or thiocyanates. For example, alkali cyanates may be produced by reacting alkali carbonates with urea. Examples of acceptable salts of cyanate include, but are not limited to, lithium cyanate, sodium cyanate, potassium cyanate, calcium cyanate, magnesium cyanate, ammonium cyanate, and cyanate amines, including primary, secondary, tertiary, and quaternary amine cyanate salts. Examples of acceptable salts of thiocyanate include, but are not limited to, lithium thiocyanate, sodium thiocyanate, potassium thiocyanate, calcium thiocyanate, magnesium thiocyanate, ammonium thiocyanate, and thiocyanate amines, including primary, secondary, tertiary, and quaternary amine thiocyanate salts.

The acceptable salt of cyanate or thiocyanate or combination thereof may be in any form, e.g., solid form, such as crystals, powders, granules, pellets, and the like.

The acceptable salt may be combined with (e.g., dissolved in) one or more solvents. In some embodiments, the one or more solvents comprise water. In some embodiments, the one or more solvents comprise the one or more agrichemicals. In some embodiments, the one or more solvents comprise one or more other agrichemicals. Dissolution dissociates the one or more salts into their respective ions (i.e., cyanate and/or thiocyanate, as the case may be). As used herein, a seed crop treatment is said to comprise an acceptable salt of cyanate or thiocyanate or combination thereof even if the salt has dissociated in the treatment into its respective ions by, e.g., dissolution.

In some embodiments, the one or more agrichemicals are chosen from pesticides (including bactericides (e.g., streptomycin), herbicides, insecticides, fungicides, and biocides), fertilizers, desiccants, defoliants (some, but not all, defoliants are desiccants), plant growth regulators, adjuvants, (such as, surfactants and crop oil concentrates), and combinations thereof. Examples of herbicides include, but are not limited to, atrazine, glyphosate, and 2,4-D. Examples of fungicides include, but are not limited to, biological agents, captan, carboxin, difenoconazole, fludioxonil, imazalil, mefenoxam, PCNB, tebuconazole, thiabendazole, thiram, and triadimenol. Examples of insecticides include, but are not limited to, chlorpyriphos, bifenthrin, imidacloprid, lindane, permethrin, tefluthrin, and thiamethoxam. Examples of defoliants include, but are not limited to, sodium chlorate, sodium cacodylate, dimethipin, diuron, endothall, paraquat, pyraflufen-ethyl, tribufos, and thidiazuron.

In certain embodiments, the one or more agrichemicals comprise a desiccant. In certain embodiments, the one or more agrichemicals comprise a defoliant. In certain embodiments, the defoliant comprises sodium chlorate. In certain embodiments, the defoliant is a defoliant produced by Drexel Chemical Company, such as Defol® 5 or Defol®750. In other embodiments, the one or more agrichemicals comprise a herbicide. In certain embodiments, the herbicide comprises glyphosate. In other embodiments, the one or more agrichemicals comprise an insecticide. In certain embodiments, the insecticide comprises bifenthrin.

In some embodiments, the acceptable salt of cyanate or thiocyanate or combination thereof comprises sodium cyanate, sodium thiocyanate, or a combination thereof. In some embodiments, the sodium cyanate, sodium thiocyanate, or combination thereof is dissolved in one or more solvents. In some embodiments, the one or more solvents comprise water. In some embodiments, the one or more solvents comprise the one or more agrichemicals, such as those described above, e.g., a defoliant. In certain embodiments, the defoliant comprises sodium chlorate. In certain embodiments, the defoliant is a defoliant produced by Drexel Chemical Company, such as Defol® 5 or Defol® 750.

The seed crop treatment may be in a form including, but not limited to, a liquid, solid (e.g., crystal), semi-solid, or gas. For example, in some embodiments, the seed crop treatment is in a solid form and is optionally combined with one or more solvents, such as water or other agrichemicals such as those described above. In other embodiments, for example, the seed crop treatment is in a liquid form, including a concentrated liquid form, and is optionally combined with other solvents, such as water or other agrichemicals such as those described above.

The seed crop treatment may comprise an effective amount of the cyanate, thiocyanate, acceptable salt of cyanate or thiocyanate, ester of cyanate or thiocyanate, isocyanate or isothiocyanate, or combination thereof. In some embodiments, the effective amount is sufficient to improve one or more qualities of a seed assemblage compared to a control. In certain embodiments, the one or more improved seed qualities are chosen from enhanced seed vigor, increased quantity and/or proportion of saleable seed, increased uniformity of seed shape and size, and desirable bag weight. In certain embodiments, at least one of the improved seed qualities is enhanced seed vigor.

In some embodiments, an effective amount of the acceptable salt of cyanate or thiocyanate or combination thereof is chosen to achieve a coverage of the acceptable salt ranging from about 20 g to about 0.2 g per acre of field crop. The effective amount in the treatment can therefore vary depending on the type of application (e.g., aerial, ground (machine or backpack)) and the total volume of treatment that is to be applied to the crops. For example, using some techniques, such as ground application, approximately 20 gallons of seed crop treatment might be applied per acre. Thus, the effective amount in the treatment to achieve a coverage of the acceptable salt ranging from about 20 g to about 0.2 g per acre of field crop is about 1 g to about 0.01 g of the acceptable salt per gallon of the treatment. In another example, using some techniques, such as aerial application, approximately 8 gallons of seed crop treatment might be applied per acre. Thus, the effective amount in the treatment to achieve a coverage of the acceptable salt ranging from about 20 g to about 0.2 g per acre of field crop is about 2.5 g to about 0.025 g of the acceptable salt per gallon of the treatment.

As described above, the seed crop treatment may be in a concentrated liquid form. This refers to a seed crop treatment in liquid form that is concentrated with cyanate, thiocyanate, an acceptable salt of cyanate or thiocyanate, an ester of cyanate or thiocyanate, an isocyanate or isothiocyanate, or a combination thereof such that the treatment may be diluted with additional components to produce a treatment having an effective amount of the cyanate, thiocyanate, acceptable salt of cyanate or thiocyanate, ester of cyanate or thiocyanate, isocyanate or isothiocyanate, or combination thereof. The concentrated liquid form itself may contain an effective amount of the cyanate, thiocyanate, acceptable salt of cyanate or thiocyanate, ester of cyanate or thiocyanate, isocyanate or isothiocyanate, or combination thereof.

The seed crop treatment presently disclosed may further comprise one or more excipients. For example, one or more excipients may include, but are not limited to, nutrients, fillers, binders, carriers, stickers, surfactants, plasticizers, colorants, dyes, dispersants, emulsifiers, flow agents, anti-foam agents, lubricants, or any other excipient that may be acceptable for use in agriculture.

Methods

Also disclosed herein is a method of preparing a seed crop treatment. The method comprises combining cyanate, thio-cyanate, an acceptable salt of cyanate or thiocyanate, an ester of cyanate or thiocyanate, an isocyanate or isothiocya-nate, or a combination thereof with one or more agrichemi-cals. As described above, the one or more agrichemicals may be in a form, including, but not limited to, a solid, semi-solid, liquid, gas, or combinations thereof. The acceptable salt of cyanate or thiocyanate or combination thereof may be in any form, e.g., solid form, such as crystals, powders, granules, pellets, and the like.

The method of combining is not limited to any particular technique. For example, components may be combined by mixing, dissolving, suspending, incorporating, milling, granulating, or any other way of combining the components.

In some embodiments, the method further comprises dissolving the acceptable salt of cyanate or thiocyanate or combination thereof in one or more solvents prior to the combining step. In some embodiments, the one or more solvents comprise water.

In some embodiments, the combining step comprises dissolving the acceptable salt of cyanate or thiocyanate or combination thereof in the one or more agrichemicals.

Examples of acceptable salts of cyanate and thiocyanate include, but are not limited to, those described above. In certain embodiments, the one or more agrichemicals are chosen from pesticides (including bactericides (e.g., strep-tomycin), herbicides, insecticides, fungicides, and biocides), fertilizers, desiccants, defoliants (some, but not all, defoli-ants are desiccants), plant growth regulators, adjuvants (such as, surfactants and crop oil concentrators), and combinations thereof. Examples of herbicides, fungicides, insecticides, and defoliants, include, but are not limited to, those described above. In certain embodiments, the one or more agrichemicals comprise a desiccant. In certain embodi-ments, the one or more agrichemicals comprise a defoliant. In certain embodiments, the defoliant comprises sodium chlorate. In certain embodiments, the defoliant is a defoliant produced by Drexel Chemical Company, such as Defol® 5 or Defol® 750. In other embodiments, the one or more agrichemicals comprise a herbicide. In certain embodi-ments, the herbicide comprises glyphosate. In other embodi-ments, the one or more agrichemicals comprise an insecti-cide. In certain embodiments, the insecticide comprises bifenthrin.

In some embodiments, the acceptable salt of cyanate or thiocyanate or combination thereof comprises sodium cyanate, sodium thiocyanate, or a combination thereof, and the one or more agrichemicals comprise a desiccant. In some embodiments, the acceptable salt comprises sodium cyanate, sodium thiocyanate, or a combination thereof, and the one or more agrichemicals comprise a defoliant. In certain embodi-ments, the defoliant comprises sodium chlorate. In certain embodiments, the defoliant is a defoliant produced by Drexel Chemical Company, such as Defol® 5 or Defol® 750.

An effective amount of the cyanate, thiocyanate, accept-able salt of cyanate or thiocyanate, ester of cyanate or thiocyanate, isocyanate or isothiocyanate, or combination thereof may be combined with the one or more agrichemi-cals. In some embodiments, the effective amount is sufficient to improve one or more qualities of a seed assemblage compared to a control. In certain embodiments, the one or more improved seed qualities are chosen from enhanced seed vigor, increased quantity and/or proportion of saleable seed, increased uniformity of seed shape and size, and desirable bag weight. In certain embodiments, at least one of the improved seed qualities is enhanced seed vigor.

As described above, in some embodiments, an effective amount of the acceptable salt of cyanate, thiocyanate or combination thereof is chosen to achieve a coverage of the acceptable salt ranging from about 20 g to about 0.2 g per acre of field crop.

In a further embodiment, a method of preparing a seed crop treatment comprises combining cyanate, thiocyanate, an acceptable salt of cyanate or thiocyanate, an ester of cyanate or thiocyanate, an isocyanate or isothiocyanate, or a combination thereof with one or more agrichemicals, result-ing in a concentrated amount of the cyanate, thiocyanate, acceptable salt of cyanate or thiocyanate, ester of cyanate or thiocyanate, isocyanate or isothiocyanate, or combination thereof. A concentrated amount, as described above, refers to an amount that may be diluted with one or more additional components to yield an effective amount of the cyanate, thiocyanate, acceptable salt of cyanate or thiocyanate, ester of cyanate or thiocyanate, isocyanate or isothiocyanate, or combination thereof. The concentrated amount may itself be an effective amount.

The method may further comprise including one or more excipients as described above. For example, one or more excipients may include, but are not limited to, nutrients, fillers, binders, carriers, stickers, surfactants, plasticizers, colorants, dyes, dispersants, emulsifiers, flow agents, anti-foam agents, lubricants, or any other excipient that may be acceptable for use in agriculture.

In another embodiment of the present disclosure, a method of producing seeds comprises treating a stand of seed crops with a chemical composition (or seed crop treatment) comprising cyanate, thiocyanate, an acceptable salt of cyanate or thiocyanate, an ester of cyanate or thio-cyanate, an isocyanate or isothiocyanate, or a combination thereof.

In some embodiments, the chemical composition (or seed crop treatment) further comprises one or more solvents. For example, the acceptable salt of cyanate or thiocyanate or combination thereof may be combined with (e.g., dissolved in) one or more solvents. The one or more solvents may comprise water. In some embodiments, the one or more solvents comprise one or more agrichemicals. In certain embodiments, the one or more agrichemicals are chosen from pesticides (including bactericides (e.g., streptomycin), herbicides, insecticides, fungicides, and biocides), fertiliz-ers, desiccants, defoliants (some, but not all, defoliants are desiccants), plant growth regulators, adjuvants (such as surfactants and crop oil concentrators), and combinations thereof. Examples of herbicides, fungicides, insecticides, and defoliants, include, but are not limited to, those described above.

The one or more agrichemicals may be in a form, includ-ing, but not limited to, a solid, semi-solid, liquid, gas, or combinations thereof. In some embodiments, the one or more agrichemicals comprise a desiccant. In some embodi-ments, the one or more agrichemicals comprise a defoliant.

In certain embodiments, the defoliant comprises sodium chlorate. In certain embodiments, the defoliant is a defoliant produced by Drexel Chemical Company, such as Defol® 5 or Defol® 750. In other embodiments, the one or more agrichemicals comprise a herbicide. In certain embodiments, the herbicide comprises glyphosate. In other embodiments, the one or more agrichemicals comprise an insecticide. In certain embodiments, the insecticide comprises bifenthrin.

In some embodiments, the acceptable salt of cyanate or thiocyanate or combination thereof comprises sodium cyanate, sodium thiocyanate, or a combination thereof. In some embodiments, the sodium cyanate, sodium thiocyanate, or combination thereof is dissolved in one or more solvents. In some embodiments, the one or more solvents comprise water. In some embodiments, the one or more solvents comprise an agrichemical, such as those described above (e.g., a defoliant). In certain embodiments, the defoliant comprises sodium chlorate. In certain embodiments, the defoliant is a defoliant produced by Drexel Chemical Company, such as Defol® 5 or Defol® 750.

In some embodiments, the stand of seed crops is treated with an amount of the acceptable salt of cyanate or thiocyanate or combination thereof in a range from about 20 g to about 0.2 g per acre. In certain embodiments, the stand of seed crops is treated with about 20 g, with about 10 g, with about 5 g, with about 2.5 g, with about 1 g, or with about 0.2 g (or any number in between) of the acceptable salt per acre.

The chemical composition (or seed crop treatment) may comprise an effective amount of the cyanate, thiocyanate, acceptable salt of cyanate or thiocyanate, ester of cyanate or thiocyanate, isocyanate or isothiocyanate, or combination thereof. In some embodiments, the effective amount is sufficient to improve one or more qualities of a seed assemblage compared to a control. In certain embodiments, the one or more improved seed qualities are chosen from enhanced seed vigor, increased quantity and/or proportion of saleable seed, increased uniformity of seed shape and size, and desirable bag weight. In certain embodiments, at least one of the improved seed qualities is enhanced seed vigor. As described above, the effective amount in the treatment can vary depending on the type of application and the total volume of treatment that is to be applied to the crops.

The method of producing seeds may further comprise harvesting the stand of seed crops, wherein a seed assemblage is obtained from the stand having one or more improved qualities compared to a control. The one or more improved qualities may include, but are not limited to, enhanced seed vigor, increased quantity and/or proportion of saleable seed, increased uniformity of seed shape and size, and desirable bag weight. In some embodiments, at least one of the improved qualities is enhanced seed vigor.

The step of treating or applying the stand of seed crops with the chemical composition (or seed crop treatment) may take into consideration one or more of the following factors: a development stage of the seed crop at the time of treating or applying; a seed moisture level at the time of treating or applying; and a desired time period between treating or applying and harvesting.

For instance, the step of treating or applying the stand of seed crops with the seed crop treatment occurs at a development stage of the seed crop. Treating the seed crop may occur at any stage or combination of stages up to and through physiological seed maturity. For example, treating or applying may occur before or during the period of time when a seed is storing nutrients. In some embodiments, treatment occurs at any stage or combination of stages beginning with fertilization through physiological seed maturity. Further, for example, when the seed crop is maize, the treatment may occur at the grain fill stages. That is, the grain fill period begins with fertilization and initiation of kernel development and ends at a time period approximately 60 days later when the kernels are physiologically mature. For example, treatment of corn may occur at kernel blister stage, kernel milk stage, kernel dough stage, kernel dent stage, physiological maturity stage or at a combination of stages. In some embodiments, the stand of seed crops is treated in the dent stage, such as at early dent, at about to full dent, or at full dent. Treating may occur one or more times during the development stages of the seed crop, such as the grain fill stages of corn, for example once during the kernel blister stage and once again during the dent stage. In certain embodiments, the stand of corn is treated with the seed crop treatment once at full dent.

The step of treating or applying the stand of seed crops with the seed crop treatment occurs at a seed moisture level. For example, in some embodiments, when the seed crop is maize, the treatment occurs at a seed moisture level ranging from 30-60%, such as, from 35-55%, 40-50%, 42-48%, or 44-46%.

In some embodiments, when the seed crop is maize, the step of treating or applying the stand of seed crops with the seed crop treatment occurs 3 to 30 days (or any number in between) before harvesting, such as, 5 to 25 days, 7 to 18 days, 9 to 14 days, or 10 to 12 days before harvesting.

The seed crop treatment may be in a form including, but not limited to, a liquid, solid (e.g., crystal), semi-solid, or gas. In some embodiments, the seed crop treatment is in a solid form, including, but not limited to, crystals, powders, granules, pellets, and the like. In these embodiments, the stand of seed crops may be treated with the seed crop treatment according to any technique that results in the stand of seed crops being contacted with the treatment. For example, the step of treating the stand of seed crops may comprise dusting the stand with the treatment.

In other embodiments, the seed crop treatment is in a liquid form, including, but not limited to, solutions and suspensions. In these embodiments, the stand of seed crops may be treated with the seed crop treatment according to any technique that results in the stand of seed crops being contacted with the treatment. For example, the step of treating the stand of seed crops may comprise spraying the stand with the treatment.

In some embodiments, the seed crops are chosen from monocots and dicots, as discussed above. In certain embodiments, the seed crops are chosen from maize, sorghum, wheat, rice, barley, oats, soybean, tomato, sunflower, and cotton.

As described above, the one or more solvents may comprise one or more agrichemicals, or the seed crop treatment may otherwise further comprise one or more agrichemicals. In some embodiments, the stand of seed crops is treated with the seed crop treatment at a crop growth stage that is suitable or even optimal for treatment with the one or more agrichemicals. For example, in embodiments where the one or more agrichemicals is a defoliant, the stand of seed crops may be treated with the seed crop treatment at a crop growth stage that is suitable or even optimal for defoliation.

In the context of the present disclosure, a stand of seed crops may be harvested to obtain a seed assemblage. The present disclosure is not limited by any particular harvesting technique. For example, harvesting the stand of seed crops may be performed according to known or optimal times and techniques in the art for the type of seed crop to be harvested.

In a further embodiment of the present disclosure, a seed assemblage is obtained by a method comprising treating a stand of seed crops with a seed crop treatment that comprises cyanate, thiocyanate, an acceptable salt of cyanate or thiocyanate, an ester of cyanate or thiocyanate, an isocyanate or isothiocyanate, or a combination thereof, and harvesting the stand of seed crops, wherein a seed assemblage is obtained from the stand having one or more improved qualities compared to a control. The one or more improved qualities may include, but are not limited to, enhanced seed vigor, increased quantity and/or proportion of saleable seed, increased uniformity of seed shape and size, and desirable bag weight. In some embodiments, at least one of the improved qualities is enhanced seed vigor.

The compositions and methods described herein will be further described by the following non-limiting examples, which are intended to be exemplary.

EXAMPLES

Example 1

In an actively growing seed corn field scheduled to be treated with Drexel Defol® 750, four test plots were evaluated. Two plots were treated with Drexel Defol® 5, a sodium chlorate formulation containing 5 pounds of active sodium chlorate per gallon, and with varying amounts of cyanate anions. Sodium cyanate salt was used as the source of cyanate for its compatibility with sodium chlorate. The results of these two treatments were compared to an untreated check and a plot treated with Defol® 750, which contained 7.5 pounds of active sodium chlorate per gallon. The amount of active sodium chlorate applied in the three treated plots was equivalent.

The test conditions and treatments for each plot are summarized below.

Test Conditions:
Crop: Inbred Seed Corn
Variety: A0036RMQKZ×HCL4011

12

Season/Year: Summer/2013
Corn Stage: Full Dent
Application Equipment: Case Patriot Sprayer
Application Conditions: Temperature: 86° F.
  Sky: Sunny
  Wind: 4 mph
Application Diluent: Water
Application Volume: 20 gallons per acre
Number of full days between application and harvest: 24 days
Post Harvest Seed
  Treatment: CruiserMaxx® Corn 250
Test Plot Treatments:
  Plot 1—Untreated Check
    Plot Size: 5 acres
  Plot 2—Treatment A
    Defol® 5: 4.8 quarts per acre
    Sodium cyanate: 6.4 grams per acre
    Water: 75.2 quarts per acre
    Plot Size: 5 acres
  Plot 3—Treatment B
    Defol® 5: 4.8 quarts per acre
    Sodium cyanate: 15.9 grams per acre
    Water: 75.2 quarts per acre
    Plot size: 5 acres
  Plot 4—Defol® 750 Treatment Check
    Defol® 750: 3.2 quarts per acre
    Water: 76.8 quarts per acre
    Plot size: 7 acres Samples of corn seed from each of the four test plots were evaluated for seed size, shape, as well as germination under certain test conditions: warm germination, cold germination and saturated cold germination. Each of the four evaluated categories (i.e., 26/21 Round, 21/17 Round, 26/21 Flat, 21/17 Flat) constituted desirable and saleable seed size and shape. Evaluation was performed at Biodiagnostics, Inc., River Falls, WI. The results were as follows:

Plot 1
Untreated Check

| Size Range ($\frac{1}{16}$th inches) | Shape | Estimated Units (Bags) per 1000 Bushels | Estimated Bag (Unit) Weight (Pounds) | Warm Germination (%) | Cold Germination (%) | Saturated Cold Germination (%) |
|---|---|---|---|---|---|---|
| 26/21 | Round | 403 | 61.8 | 100 | 92 | 81 |
| 21/17 | Round | 166 | 44.8 | 99 | 90 | 76 |
| 26/21 | Flat | 278 | 51.8 | 100 | 95 | 79 |
| 21/17 | Flat | 82 | 40.6 | 95 | 89 | 79 |
| Total Saleable Units | | 929 | | | | |

Plot Sizes: 5 acres for Plots 1-3; 7 acres for Plot 4
Plot Location: Near Oxford, WI Plot 2
Treatment A

| Size Range ($\frac{1}{16}$th inches) | Shape | Estimated Units (Bags) per 1000 Bushels | Estimated Bag (Unit) Weight (Pounds) | Warm Germination (%) | Cold Germination (%) | Saturated Cold Germination (%) |
|---|---|---|---|---|---|---|
| 26/21 | Round | 450 | 59.1 | 100 | 97 | 95 |
| 21/17 | Round | 184 | 43.5 | 99 | 97 | 92 |
| 26/21 | Flat | 249 | 49.4 | 100 | 98 | 98 |

-continued

| Size Range ($\frac{1}{16}^{th}$ inches) | Shape | Estimated Units (Bags) per 1000 Bushels | Estimated Bag (Unit) Weight (Pounds) | Warm Germination (%) | Cold Germination (%) | Saturated Cold Germination (%) |
|---|---|---|---|---|---|---|
| 21/17 | Flat | 96 | 38.0 | 98 | 97 | 94 |
| Total Saleable Units | | 979 | | | | |

Plot 3
Treatment B

| Size Range ($\frac{1}{16}^{th}$ inches) | Shape | Estimated Units (Bags) per 1000 Bushels | Estimated Bag (Unit) Weight (Pounds) | Warm Germination (%) | Cold Germination (%) | Saturated Cold Germination (%) |
|---|---|---|---|---|---|---|
| 26/21 | Round | 487 | 59.2 | 100 | 92 | 94 |
| 21/17 | Round | 228 | 43.2 | 98 | 93 | 91 |
| 26/21 | Flat | 190 | 49.4 | 99 | 90 | 95 |
| 21/17 | Flat | 69 | 36.4 | 96 | 91 | 93 |
| Total Saleable Units | | 974 | | | | |

Plot 4
Defol® 750 Treatment Check

| Size Range ($\frac{1}{16}^{th}$ inches) | Shape | Estimated Units (Bags) per 1000 Bushels | Estimated Bag (Unit) Weight (Pounds) | Warm Germination (%) | Cold Germination (%) | Saturated Cold Germination (%) |
|---|---|---|---|---|---|---|
| 26/21 | Round | 482 | 60.8 | 100 | 90 | 84 |
| 21/17 | Round | 180 | 44.6 | 99 | 91 | 80 |
| 26/21 | Flat | 224 | 50.0 | 99 | 98 | 83 |
| 21/17 | Flat | 60 | 39.9 | 96 | 92 | 81 |
| Total Saleable Units | | 946 | | | | |

The results showed that treatment of the growing corn seed crops with small amounts of cyanate (Plots 2 & 3) surprisingly produced significantly higher yields of seeds in desirable and saleable sizes and shapes over both the Untreated Check (Plot 1) and the Defol® 750 Treatment Check (Plot 4).

Moreover, treatment of the corn seed crops with small amounts of cyanate (Plots 2 & 3) unexpectedly produced seeds with a dramatic increase in seed vigor over both the Untreated Check (Plot 1) and the Defol® 750 Treatment Check (Plot 4) as evidenced by the increased germination percentages in the saturated cold germination test.

The results also showed some tendency of the Defol® 750 to slightly increase germination percentage in the saturated cold germination test. This increase was likely a function of the Defol® 750 plot yielding seeds in the larger 26/21 size category than the untreated check, as opposed to the Defol® 750 having an actual impact on seed germination.

The growing conditions in the summer of 2013 for the experiments in Example 1 were about average with around normal temperatures and rainfall for the time of year.

Example 2

Additional field plots were tested using three different corn hybrids: Hybrid 1 (E16-D2507VT3P), Hybrid 2 (E17-D2905VT3P), and Hybrid 3 (Heitman-D3910VT2P).
Hybrid 1

Three test plots were evaluated for Hybrid 1. One plot was treated with a combination of Drexel Defol® 5—a sodium chlorate formulation containing 5 pounds of active sodium chlorate per gallon—and cyanate (sodium cyanate salt was used as the source of cyanate for its compatibility with sodium chlorate). The results of this treatment were compared to an untreated check and plot treated with Defol® 750, containing 7.5 pounds of active sodium chlorate per gallon.

The test conditions and treatments for each plot are summarized below.
Test Conditions:
    Crop: Inbred Seed Corn
    Variety: D2507VT3P
    Plot Location: Jackson, WI
    Season/Year: Summer/2014
    Corn Stage at Application: to Full Dent
    Moisture at Application: 42%

Application Equipment: Case Patriot Sprayer

Application Conditions: Temperature: 88-90° F.

Sky: Clear

Wind: 2-3 mph

Application Diluent: Water

Application Volume: 20 gallons per acre

Number of full days between application and harvest: 8 days

Post Harvest Seed Treatment: CruiserMaxx® Corn 250

Test Plot Treatments:

Plot 1—Untreated Check

Plot Size: Balance of Field

Plot 2—Treatment A

Defol® 5: 4.8 quarts per acre

Sodium cyanate: 6.4 grams per acre

Water: 75.2 quarts per acre

Plot Size: 16 acres

Plot 3—Defol® 750 Treatment Check

Defol® 750: 3.2 quarts per acre

Water: 76.8 quarts per acre

Plot Size: 16 acres

Samples of corn seed from each of the three test plots were evaluated for desirable/saleable seed size and shape, as well as germination under certain test conditions: warm germination, cold germination and saturated cold germination. Each of the four evaluated categories (i.e., 24/21 Round, 21/17 Round, 24/21 Flat, 21/17 Flat) constituted desirable and saleable seed size and shape. The results were as follows—

Plot 1—Check

| | HARVEST MOISTURE = 34.8% | | | | | | | |
|---|---|---|---|---|---|---|---|---|
| | EST. UNITS | EST. BAG WT. | WARM GERM | COLD GERM | SUPER COLD | | 0 ABOVE 25 | |
| 24/21R | 334 | 61.4 | 99% | 98% | 98% | | | % RDS |
| 21/17R | 418 | 48.8 | 98% | 99% | 97% | 55.59% | | 78.09% % SR OF ALL RDS |
| 24/21F | 105 | 53.9 | 98% | 98% | 98% | | | |
| 21/17F | 106 | 45 | 98% | 99% | 97% | 50.24% | | % SF OF ALL FL |
| | 963 | | 393% | 394% | 390% | | 5 BELOW 17 | |

Plot 2—Defol® 5+Cyanate

| | HARVEST MOISTURE = 33.4% | | | | | | | |
|---|---|---|---|---|---|---|---|---|
| | EST. UNITS | EST. BAG WT. | WARM GERM | COLD GERM | SUPER COLD | | 0 ABOVE 25 | |
| 24/21R | 270 | 59.1 | 100% | 98% | 98% | | | % RDS |
| 21/17R | 422 | 43.5 | 99% | 98% | 97% | 60.98% | | 70.33% |
| 24/21F | 117 | 49.4 | 99% | 100% | 99% | | | |
| 21/17F | 175 | 38 | 98% | 98% | 99% | 59.93% | | |
| | 984 | | 396% | 394% | 393% | | 12 BELOW 17 | |

Plot 3—Defol® 750

| | HARVEST MOISTURE = 31.1% | | | | | | | |
|---|---|---|---|---|---|---|---|---|
| | EST. UNITS | EST. BAG WT. | WARM GERM | COLD GERM | SUPER COLD | | 0 ABOVE 25 | |
| 24/21R | 309 | 59.9 | 99% | 99% | 99% | | | % RDS |
| 21/17R | 413 | 48.8 | 96% | 98% | 97% | 57.20% | | 73.30% |
| 24/21F | 109 | 51.9 | 99% | 99% | 99% | | | |
| 21/17F | 154 | 42.6 | 98% | 99% | 98% | 58.56% | | |
| | 985 | | 392% | 395% | 393% | | 12 BELOW 17 | |

Hybrid 2

Four test plots were evaluated for Hybrid 2. One plot was treated with a combination of Drexel Defol® 5 and cyanate (sodium cyanate salt was used as the source of cyanate for its compatibility with sodium chlorate). Another plot was treated with cyanate alone (i.e., without Defol® 5). The results of these treatments were compared to an untreated check and a plot treated with Defol® 750.

The test conditions and treatments for each plot are summarized below.

Test Conditions:

Crop: Inbred Seed Corn

Variety: D2905VT3P

Plot Location: New Haven, WI

Season/Year: Summer/2014

Corn Stage at Application: to Full Dent

Moisture at Application: 44%

Application Equipment: Case Patriot Sprayer

Application Conditions: Temperature: 88-90° F.

Sky: Clear

Wind: 2-3 mph

Application Diluent: Water

Application Volume: 20 gallons per acre

Number of full days between application and harvest: 10 days

Post Harvest Seed Treatment: CruiserMaxx® Corn 250

Test Plot Treatments:

Plot 1—Untreated Check

Plot Size: Balance of Field

Plot 2—Treatment A

Defol® 5: 4.8 quarts per acre

Sodium cyanate: 6.4 grams per acre

Water: 75.2 quarts per acre

Plot Size: 16 acres

Plot 3—Defol® 750 Treatment Check

Defol® 750: 3.2 quarts per acre

Water: 76.8 quarts per acre

Plot Size: 16 acres

Plot 4—Treatment B

Sodium cyanate: 6.4 grams per acre

Water: 80 quarts per acre

Plot Size: 16 acres

Samples of corn seed from each of the three test plots were evaluated for desirable/saleable seed size and shape, as well as germination under certain test conditions: warm germination, cold germination and saturated cold germination. Each of the four evaluated categories (i.e., 24/21 Round, 21/16 Round, 24/21 Flat, 21/16 Flat) constituted desirable and saleable seed size and shape. The results were as follows:

Plot 1—Untreated Check

|  | HARVEST MOISTURE = 34.8% | | | | | | | |
|  | EST. UNITS | EST. BAG WT. | WARM GERM | COLD GERM | SUPER COLD | | GRAMS 5 | ABOVE 25 |
| --- | --- | --- | --- | --- | --- | --- | --- | --- |
| 24/21R | 283 | 61.2 | 99% | 97% | 98% | | | % RDS |
| 21/16R | 377 | 46.2 | 98% | 95% | 88% | 57.12% | | 66.20% |
| 24/21F | 183 | 51.9 | 99% | 98% | 99% | | | |
| 21/16F | 154 | 41.3 | 98% | 96% | 93% | 45.70% | | |
| | 997 | | 394% | 386% | 378% | | 17 | BELOW 17 |

Plot 2—Defol® 5+Cyanate

|  | HARVEST MOISTURE = 31.3% | | | | | | | |
|  | EST. UNITS | EST. BAG WT. | WARM GERM | COLD GERM | SUPER COLD | | 0 | ABOVE 25 |
| --- | --- | --- | --- | --- | --- | --- | --- | --- |
| 24/21R | 179 | 60 | 99% | 97% | 98% | | | % RDS |
| 21/16R | 532 | 45.1 | 97% | 98% | 96% | 74.82% | | 64.58% |
| 24/21F | 121 | 48.2 | 98% | 97% | 99% | | | |
| 21/16F | 269 | 36.9 | 99% | 98% | 97% | 68.97% | | |
| | 1101 | | 393% | 390% | 390% | | 36 | BELOW 17 |

Plot 3—Defol® 750

|  | HARVEST MOISTURE = 32.8% | | | | | | | |
|  | EST. UNITS | EST. BAG WT. | WARM GERM | COLD GERM | SUPER COLD | | 1 | ABOVE 25 |
| --- | --- | --- | --- | --- | --- | --- | --- | --- |
| 24/21R | 257 | 61 | 100% | 97% | 98% | | | % RDS |
| 21/16R | 451 | 46.8 | 97% | 97% | 91% | 63.70% | | 70.10% |
| 24/21F | 129 | 52.8 | 98% | 97% | 99% | | | |
| 21/16F | 173 | 41.9 | 99% | 96% | 95% | 57.28% | | |
| | 1010 | | 394% | 387% | 383% | | 21 | BELOW 17 |

Plot 4—Cyanate

| | EST. UNITS | EST. BAG WT. | WARM GERM | COLD GERM | SUPER COLD | | 5 | ABOVE 25 | |
|---|---|---|---|---|---|---|---|---|---|
| HARVEST MOISTURE = 33.5% | | | | | | | | | |
| 24/21R | 253 | 60.5 | 98% | 96% | 99% | | | | % RDS |
| 21/16R | 392 | 45.7 | 96% | 96% | 92% | 60.78% | | | 63.05% |
| 24/21F | 180 | 51.6 | 99% | 99% | 97% | | | | |
| 21/16F | 198 | 40.5 | 96% | 98% | 95% | 52.38% | | | |
| | 1023 | | 389% | 389% | 383% | | 21 | BELOW 17 | |

Hybrid 3

Four test plots were evaluated for Hybrid 3. One plot was treated with a combination of Drexel Defol® 5 and cyanate (sodium cyanate salt was used as the source of cyanate for its compatibility with sodium chlorate). Another plot was treated with cyanate alone (i.e., without Defol® 5). The results of these treatments were compared to an untreated check and a plot treated with Defol® 750.

The test conditions and treatments for each plot are summarized below.

Test Conditions:
Crop: Inbred Seed Corn
Variety: D3910VT2P
Plot Location: Springville, WI
Season/Year: Summer/2014
Corn Stage at Application: Very early start of dent
Moisture at Application: 50-55%
Application Equipment: Case Patriot Sprayer
Application Conditions: Temperature: 88-90° F.
  Sky: Clear
  Wind: 2-3 mph
Application Diluent: Water
Application Volume: 20 gallons per acre
Number of full days between application and harvest: 17
  days Post Harvest Seed Treatment: CruiserMaxx® Corn 250
Test Plot Treatments:
  Plot 1—Untreated Check
    Plot Size: Balance of Field
  Plot 2—Treatment A
    Defol® 5: 4.8 quarts per acre
    Sodium cyanate: 6.4 grams per acre
    Water: 75.2 quarts per acre
    Plot Size: 16 acres
  Plot 3—Defol® 750 Treatment Check
    Defol® 750: 3.2 quarts per acre
    Water: 76.8 quarts per acre
    Plot Size: 16 acres
  Plot 4—Treatment B
    Sodium cyanate: 6.4 grams per acre
    Water: 80 quarts per acre
    Plot Size: 16 acres Samples of corn seed from each of the three test plots were evaluated for desirable/saleable seed size and shape, as well as germination under certain test conditions: warm germination, cold germination and saturated cold germination. Each of the four evaluated categories (i.e., 25/20 Round, 20/16 Round, 25/20 Flat, 20/16 Flat) constituted desirable and saleable seed size and shape. The results were as follows:

Plot 1—Untreated Check

| | EST. UNITS | EST. BAG WT. | WARM GERM | COLD GERM | SUPER COLD | | GRAMS 6 | ABOVE 25 | |
|---|---|---|---|---|---|---|---|---|---|
| HARVEST MOISTURE = 35.0% | | | | | | | | | |
| 25/20R | 278 | 61.2 | 99% | 93% | 90% | | | | % RDS |
| 20/16R | 170 | 44.9 | 99% | 87% | 77% | 37.95% | | | 46.19% |
| 25/20F | 345 | 53.5 | 100% | 93% | 80% | | | | |
| 20/16F | 177 | 42 | 96% | 81% | 63% | 33.91% | | | |
| | 970 | | 394% | 354% | 310% | | 15 | BELOW 17 | |

Plot 2—Defol® 5+Cyanate

| | EST. UNITS | EST. BAG WT. | WARM GERM | COLD GERM | SUPER COLD | | 0 | ABOVE 25 | |
|---|---|---|---|---|---|---|---|---|---|
| HARVEST MOISTURE = 30.2% | | | | | | | | | |
| 25/20R | 209 | 53.3 | 100% | 98% | 98% | | | | % RDS |
| 20/16R | 249 | 40.5 | 99% | 96% | 97% | 54.37% | | | 39.52% |
| 25/20F | 358 | 46.3 | 99% | 99% | 99% | | | | |
| 20/16F | 343 | 37.1 | 98% | 97% | 97% | 48.93% | | | |
| | 1159 | | 396% | 390% | 391% | | 34 | BELOW 17 | |

Plot 3—Defol® 750

| | HARVEST MOISTURE = 28.6% | | | | | | | |
|---|---|---|---|---|---|---|---|---|
| | EST. UNITS | EST. BAG WT. | WARM GERM | COLD GERM | SUPER COLD | | 2 | ABOVE 25 |
| 25/20R | 202 | 53 | 99% | 98% | 99% | | | % RDS |
| 20/16R | 218 | 38.2 | 98% | 95% | 97% | 51.90% | | 35.21% |
| 25/20F | 386 | 46.1 | 99% | 99% | 100% | | | |
| 20/16F | 387 | 35.5 | 97% | 98% | 98% | 50.06% | | |
| | 1193 | | 393% | 390% | 394% | | 38 | BELOW 17 |

Plot 4—Cyanate                                                                                 -

| | HARVEST MOISTURE = 34.1% | | | | | | | |
|---|---|---|---|---|---|---|---|---|
| | EST. UNITS | EST. BAG WT. | WARM GERM | COLD GERM | SUPER COLD | | 4 | ABOVE 25 |
| 25/20R | 234 | 57 | 99% | 97% | 95% | | | % RDS |
| 20/16R | 218 | 42.7 | 96% | 95% | 92% | 48.23% | | 43.25% |
| 25/20F | 361 | 50.6 | 99% | 96% | 95% | | | |
| 20/16F | 232 | 40.1 | 98% | 95% | 90% | 39.12% | | |
| | 1045 | | 392% | 383% | 372% | | 23 | BELOW 17 |

As shown in the data for Hybrid 1, the combination of Defol® 5 and cyanate produced an increased quantity and proportion (i.e., increased uniformity) of seed at saleable sizes and shapes compared to the Untreated Check. The Defol® 5+cyanate treatment also resulted in an increased proportion (i.e., increased uniformity) of seed at saleable sizes and shapes compared to the Defol® 750 treatment alone (60.98% vs. 57.20% at 24/21R and 21/17R; 59.93% vs. 58.56% at 24/21F and 21/17F).

As shown in the data for Hybrid 2 and Hybrid 3, the cyanate treatment alone produced higher yields and proportions of seed at desirable and saleable sizes and shapes than the Untreated Checks. The combination of Defol® 5 and cyanate produced even greater yields and proportions of seed at desirable and saleable sizes and shapes than the Untreated Checks. The Defol® 5 and cyanate treatment also resulted in an increased proportion of seed at saleable sizes and shapes compared to the Defol® 750 treatment alone (e.g., Hybrid 2: 74.82% vs. 63.70% at 24/21R and 21/16 R; 68.97% vs. 57.28% at 24/21F and 21/16F).

Additionally, based on the super cold germination percentage, treatment with the cyanate alone and with the Defol® 5+cyanate produced seeds with increased seed vigor over the Untreated Checks, particularly for Hybrid 3. Compared to the experiments in Example 1, however, the experiments in Example 2 showed much less discrimination in the super cold germination test. This was largely due to the near-perfect growing conditions for the plots in Example 2. In particular, the growing conditions in the summer of 2014 for the experiments in Example 2 were exceptional for corn and seed corn production, with cooler than average temperatures and near to slightly above average rainfall for the time of year.

The cyanate treatment alone and the combination of Defol® 5 with cyanate led to more desirable bag weights. In every experiment in Examples 1 and 2, the Defol® 5+cyanate treatment led to estimated bag weights at or below 60 lbs at desirable and saleable seed sizes and shapes. For example, for the largest round seed size for each experiment in Examples 1 and 2, the combination of Defol® 5 and cyanate reduced the estimated bag weight to a more desirable weight compared to the Untreated Check. The cyanate treatment alone for Hybrids 2 and 3 also reduced the estimated bag weight to a more desirable weight compared to the Untreated Check.

What is claimed is:

1. A seed crop treatment for enhancing one or more seed assemblage qualities compared to a control, consisting essentially of an effective amount of cyanate, thiocyanate, an acceptable salt of cyanate or thiocyanate, or a combination thereof, and a defoliant,
wherein the defoliant comprises sodium chlorate and
wherein the effective amount of cyanate, thiocyanate, acceptable salt of cyanate or thiocyanate, or combination thereof ranges from about 2.5 g to about 0.01 g per gallon of the treatment.

2. The treatment of claim 1 wherein the effective amount of cyanate, thiocyanate, acceptable salt of cyanate or thiocyanate, or combination thereof is present in an amount effective to enhance the one or more seed assemblage qualities compared to the control, and further wherein the enhanced qualities are chosen from enhanced seed vigor, increased quantity of saleable seed, increased proportion of saleable seed, increased uniformity of seed shape and size, and desirable bag weight, and wherein the desirable bag weight is ranging from about 36 pounds to about 60 pounds.

3. The treatment of claim 1, wherein at least one of the enhanced qualities is enhanced seed vigor.

4. The treatment of claim 1, wherein the treatment consists essentially of the acceptable salt of cyanate or thiocyanate or combination thereof, and the acceptable salt of cyanate is chosen from lithium cyanate, sodium cyanate, potassium cyanate, calcium cyanate, magnesium cyanate, ammonium cyanate, and cyanate amine, and the acceptable salt of thiocyanate is chosen from lithium thiocyanate, sodium thiocyanate, potassium thiocyanate, calcium thiocyanate, magnesium thiocyanate, ammonium thiocyanate, and thiocyanate amine.

5. The treatment of claim 1, further consisting essentially of one or more solvents.

6. The treatment of claim 5, wherein the one or more solvents comprise water.

7. The treatment of claim 5, wherein the one or more solvents comprise one or more agrichemicals.

8. The treatment of claim 1, wherein the effective amount of cyanate, thiocyanate, an acceptable salt of cyanate or thiocyanate, or a combination thereof is the acceptable salt of cyanate or thiocyanate or combination thereof and is dissolved in the defoliant.

9. The treatment of claim 4, wherein the acceptable salt of cyanate is sodium cyanate.

10. The treatment of claim 1, wherein the defoliant comprises about 5 pounds of the sodium chlorate per gallon of the defoliant or about 7.5 pounds of the sodium chlorate per gallon of the defoliant.

11. A method of preparing a seed crop treatment for enhancing one or more seed assemblage qualities compared to a control, comprising combining an effective amount of cyanate, thiocyanate, an acceptable salt of cyanate or thiocyanate, or a combination thereof with a defoliant to form the seed crop treatment, wherein the defoliant comprises sodium chlorate, and the seed crop treatment consists essentially of the effective amount of cyanate, thiocyanate, acceptable salt of cyanate or thiocyanate, or combination thereof, and the defoliant, and wherein the effective amount of cyanate, thiocyanate, acceptable salt of cyanate or thiocyanate, ranges from about 2.5 g to about 0.01 g per gallon of the treatment.

12. The method of claim 11, wherein the effective amount of the cyanate, thiocyanate, acceptable salt of cyanate or thiocyanate, or combination thereof is present in an amount effective to enhance the one or more seed assemblage qualities compared to the control, wherein the enhanced qualities are chosen from enhanced seed vigor, increased quantity of saleable seed, increased proportion of saleable seed, increased uniformity of seed shape and size, and desirable bag weight, and wherein the desirable bag weight is ranging from about 36 pounds to about 60 pounds.

13. The method of claim 12, wherein at least one of the enhanced qualities is enhanced seed vigor.

14. The method of claim 11, wherein the effective amount of cyanate, thiocyanate, an acceptable salt of cyanate or thiocyanate, or a combination thereof is the acceptable salt of cyanate or thiocyanate or combination thereof and is combined with the defoliant, and the acceptable salt of cyanate is chosen from lithium cyanate, sodium cyanate, potassium cyanate, calcium cyanate, magnesium cyanate, ammonium cyanate, and cyanate amine, and the acceptable salt of thiocyanate is chosen from lithium thiocyanate, sodium thiocyanate, potassium thiocyanate, calcium thiocyanate, magnesium thiocyanate, ammonium thiocyanate, and thiocyanate amine.

15. The method of claim 11, wherein the combining step comprises dissolving the acceptable salt of cyanate or thiocyanate or combination thereof in the defoliant.

16. The method of claim 11, wherein the seed crop treatment further consists essentially of one or more solvents.

17. The method of claim 16, wherein the one or more solvents comprise water.

18. The method of claim 16, wherein the one or more solvents comprise one or more agrichemicals.

19. The method of claim 11, wherein the defoliant comprises about 5 pounds of the sodium chlorate per gallon of the defoliant or about 7.5 pounds of the sodium chlorate per gallon of the defoliant.

20. A method of producing seeds, comprising applying to a stand of seed crops a seed crop treatment consisting essentially of an effective amount of cyanate, thiocyanate, an acceptable salt of cyanate or thiocyanate, or a combination thereof, and a defoliant, wherein the defoliant comprises sodium chlorate, and wherein the effective amount of cyanate, thiocyanate, acceptable salt of cyanate or thiocyanate, or combination thereof ranges from about 2.5 g to about 0.01 g per gallon of the treatment, and wherein the cyanate, thiocyanate, acceptable salt of cyanate or thiocyanate, or combination thereof is applied in an amount ranging from about 20 g to about 0.2 g of the cyanate, thiocyanate, the acceptable salt of cyanate or thiocyanate, combination thereof, per acre.

21. The method of claim 20, wherein the step of applying occurs two or more times.

22. The method of claim 20, wherein the step of applying occurs at a development stage of the stand of seed crops.

23. The method of claim 22, wherein the development stage is chosen from a stage in a time period beginning with fertilization through physiological seed maturity.

24. The method of claim 20, further comprising harvesting the stand of seed crops, wherein a seed assemblage is obtained from the stand having one or more enhanced qualities compared to a control, wherein the enhanced qualities are chosen from enhanced seed vigor, increased quantity of saleable seed, increased proportion of saleable seed, increased uniformity of seed shape and size, and desirable bag weight, and wherein the desirable bag weight is ranging from about 36 pounds to about 60 pounds.

25. The method of claim 24, wherein at least one of the enhanced qualities is enhanced seed vigor.

26. The method of claim 20, wherein the seed crop treatment is in a form chosen from crystals, powder, granules, and pellets.

27. The method of claim 26, wherein the step of applying comprises dusting the stand of seed crops with the seed crop treatment.

28. The method of claim 20, wherein the seed crop treatment is in a liquid form.

29. The method of claim 28, wherein the step of applying comprises spraying the stand of seed crops with the seed crop treatment.

30. The method of claim 20, wherein the seed crop treatment consists essentially of the acceptable salt of cyanate or thiocyanate or combination thereof, and the acceptable salt of cyanate is chosen from lithium cyanate, sodium cyanate, potassium cyanate, calcium cyanate, magnesium cyanate, ammonium cyanate, and cyanate amine, and the acceptable salt of thiocyanate is chosen from lithium thiocyanate, sodium thiocyanate, potassium thiocyanate, calcium thiocyanate, magnesium thiocyanate, ammonium thiocyanate, and thiocyanate amine.

31. The method of claim 20, wherein the seed crop treatment further consists essentially of one or more solvents.

32. The method of claim 31, wherein the one or more solvents comprise water.

33. The method of claim 31, wherein the one or more solvents comprise one or more agrichemicals.

34. The method of claim 20, wherein the cyanate, thiocyanate, acceptable salt of cyanate or thiocyanate, or combination thereof, is applied in an amount ranging from about 10 g to about 0.2 g per acre.

35. The method of claim 20, wherein the cyanate, thiocyanate, acceptable salt of cyanate or thiocyanate, or combination thereof, is applied in an amount ranging from about 5 g to about 0.2 g per acre.

36. The method of claim 20, wherein the cyanate, thiocyanate, acceptable salt of cyanate or thiocyanate, or combination thereof, is applied in an amount ranging from about 2.5 g to about 0.2 g per acre.

37. The method of claim 20, wherein the seed crops are chosen from monocots and dicots.

38. The method of claim 37, wherein the monocots and dicots are chosen from maize, sorghum, wheat, rice, barley, oats, soybean, tomato, sunflower, and cotton.

39. The method of claim 20, wherein the effective amount of cyanate, thiocyanate, an acceptable salt of cyanate or thiocyanate, or a combination thereof is the acceptable salt of cyanate, the acceptable salt of thiocyanate, or the combination thereof and is dissolved in the defoliant.

40. The method of claim 20, wherein the defoliant comprises about 5 pounds of the sodium chlorate per gallon of the defoliant or about 7.5 pounds of the sodium chlorate per gallon of the defoliant.

* * * * *